(12) United States Patent
Subramanian et al.

(10) Patent No.: US 7,860,999 B1
(45) Date of Patent: *Dec. 28, 2010

(54) DISTRIBUTED COMPUTATION IN NETWORK DEVICES

(75) Inventors: Siva Subramanian, Cary, NC (US); Tal I. Lavian, Sunnyvale, CA (US)

(73) Assignee: Avaya Inc., Basking Ridge, NJ (US)

( * ) Notice: Subject to any disclaimer, the term of this patent is extended or adjusted under 35 U.S.C. 154(b) by 1839 days.

This patent is subject to a terminal disclaimer.

(21) Appl. No.: 09/736,678

(22) Filed: Dec. 13, 2000

Related U.S. Application Data

(60) Provisional application No. 60/239,484, filed on Oct. 11, 2000.

(51) Int. Cl.
*G06F 15/16* (2006.01)
*G06F 15/173* (2006.01)

(52) U.S. Cl. .............. 709/238; 709/235; 370/229; 370/230.1; 370/231; 370/234

(58) Field of Classification Search ............ 709/235, 709/238; 370/229, 230.1, 231, 235, 234
See application file for complete search history.

(56) References Cited

U.S. PATENT DOCUMENTS

| | | | | |
|---|---|---|---|---|
| 5,167,033 A | * | 11/1992 | Bryant et al. | 709/235 |
| 5,377,327 A | * | 12/1994 | Jain et al. | 709/235 |
| 5,495,426 A | * | 2/1996 | Waclawsky et al. | 709/226 |
| 5,845,091 A | * | 12/1998 | Dunne et al. | 709/240 |
| 5,854,899 A | * | 12/1998 | Callon et al. | 709/238 |
| 6,044,075 A | * | 3/2000 | Le Boudec et al. | 370/351 |
| 6,078,953 A | * | 6/2000 | Vaid et al. | 709/223 |
| 6,151,633 A | * | 11/2000 | Hurst et al. | 709/235 |
| 6,226,267 B1 | * | 5/2001 | Spinney et al. | 370/235 |
| 6,286,052 B1 | * | 9/2001 | McCloghrie et al. | 709/238 |
| 6,289,389 B1 | * | 9/2001 | Kikinis | 709/239 |
| 6,421,734 B1 | * | 7/2002 | Nessett et al. | 709/247 |
| 6,424,621 B1 | * | 7/2002 | Ramaswamy et al. | 370/230 |
| 6,570,867 B1 | * | 5/2003 | Robinson et al. | 370/351 |
| 6,611,872 B1 | * | 8/2003 | McCanne | 709/238 |
| 6,611,874 B1 | * | 8/2003 | Denecheau et al. | 709/239 |
| 6,701,363 B1 | * | 3/2004 | Chiu et al. | 709/224 |
| 6,792,461 B1 | * | 9/2004 | Hericourt | |
| 6,868,061 B1 | * | 3/2005 | Kilkki et al. | 370/230.1 |

* cited by examiner

*Primary Examiner*—Ario Etienne
*Assistant Examiner*—Avi Gold
(74) *Attorney, Agent, or Firm*—Winthrow & Terranova, PLLC

(57) ABSTRACT

The present invention facilitates routing traffic over a network and distributing application level support among multiple routing devices during routing. Routing nodes are configured to process the content of the traffic to provide the requisite application level support. The traffic is routed, in part, based on the resources available for providing the processing. The processing of the traffic may be distributed throughout the network based on processing capacity of the routing nodes at any given time and given the amount of network congestion.

50 Claims, 9 Drawing Sheets

DISTRIBUTED COMPUTATION IN NETWORK DEVICES

This application claims the benefit of provisional application No. 60/239,484, filed Oct. 11, 2000, entitled COMPUTATION IN NETWORK DEVICES, and is related to application Ser. No. 09/736,692, filed Dec. 13, 2000, entitled HIGH-SPEED COMPUTATION IN NETWORK DEVICES and Ser. No. 09/736,674, filed Dec. 13, 2000 entitled SERVICE BASED ROUTING, the disclosures of which are incorporated herein by reference in their entirety.

FIELD OF THE INVENTION

The present invention relates to processing and routing packets in a network, and in particular, to distributing application level processing among one or more routing devices during high-speed routing.

BACKGROUND OF THE INVENTION

Existing routers have limited computation capacity and offer little or no application layer support during routing. These routers are typically divided into a control plane and a forward plane. The control plane is used for basic setup and control of the router. For example, the control plane is generally used to establish routing tables used by the forward plane. The forward plane receives packets, processes the packets based on the routing tables set up by the control plane, and delivers the packets to the next-hop address or the final destination, depending on the termination point for each packet.

The forward plane in existing routers is typically limited to packet delivery based on basic header analysis and manipulation. Historically, application layer support, such as that requiring analysis or manipulation of the packet's payload, has been avoided. Those specially configured devices capable of providing application processing, such as firewalls, are uniquely configured for the special application wherein the routing speeds for normal routing in the forward plane are significantly impacted or the control plane is uniquely adapted to handle such processing. In either case, basic routing capability of the forward plane is inhibited. Thus, traditional network routers typically do not provide application level processing, and routing devices providing such support are only used in limited applications.

Nortel Networks Limited is developing routing devices capable of providing application level processing without significantly impacting forwarding performance for the packets being processed at an application level or for those requiring only basic routing. These routing devices are capable of providing various types of application level support to facilitate any number of functions or network services.

Although these routing devices provide application level support during routing, for any given traffic flow, a single device may not have the computational capacity to provide all of the processing for a given traffic flow. The capacity may be limited based on the routing device's capability or the processing required for concurrent traffic flows. Further, congested networks incorporating routing devices capable of providing application level support would be more efficient if processing could be distributed to less congested devices, which are comparably capable.

Thus, there is a need to distribute processing for application level support among routing devices capable of providing such support. There is a further need to be able to detect congested routing devices and direct traffic to routing devices with capacity for application level support without significantly impacting routing efficiency and speeds.

SUMMARY OF THE INVENTION

The present invention facilitates routing traffic over a network and distributing application level support among multiple routing devices during routing. Routing nodes are configured to process the content of the traffic to provide the requisite application level support. The traffic is routed, in part, based on the resources available for providing the processing. The processing of the traffic may be distributed throughout the network based on processing capacity of the routing nodes at any given time and given the amount of network congestion.

When traffic is routed, processing resources required for delivery of the traffic from a source to the destination are determined. Since multiple routing paths may exist, one or more paths between the source and destination capable of providing the requisite application level support during routing are identified. Next, the available processing resources in the possible paths are compared with the resources required for routing. One or more paths are then selected to optimize routing and minimize congestion. Upon selection of the one or more paths, the traffic may be routed and processed accordingly.

The requisite application level processing may be distributed among multiple routing nodes and paths to make sure that sufficient resources are available and delivery does not negatively affect other traffic. The distribution of the processing is preferably based on available resources and perhaps on other network conditions bearing on the processing and routing performance for the particular traffic flow, the network in general, or a combination thereof.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of the specification illustrate several aspects of the invention, and together with the description serve to explain the principles of the invention.

DETAILED DESCRIPTION OF THE PREFERRED EMBODIMENTS

The present invention provides for distributing application level support among multiple routing devices during routing. The application layer support may include any type of processing or network service on packet content. The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of this disclosure and the accompanying claims.

Figure 1A:
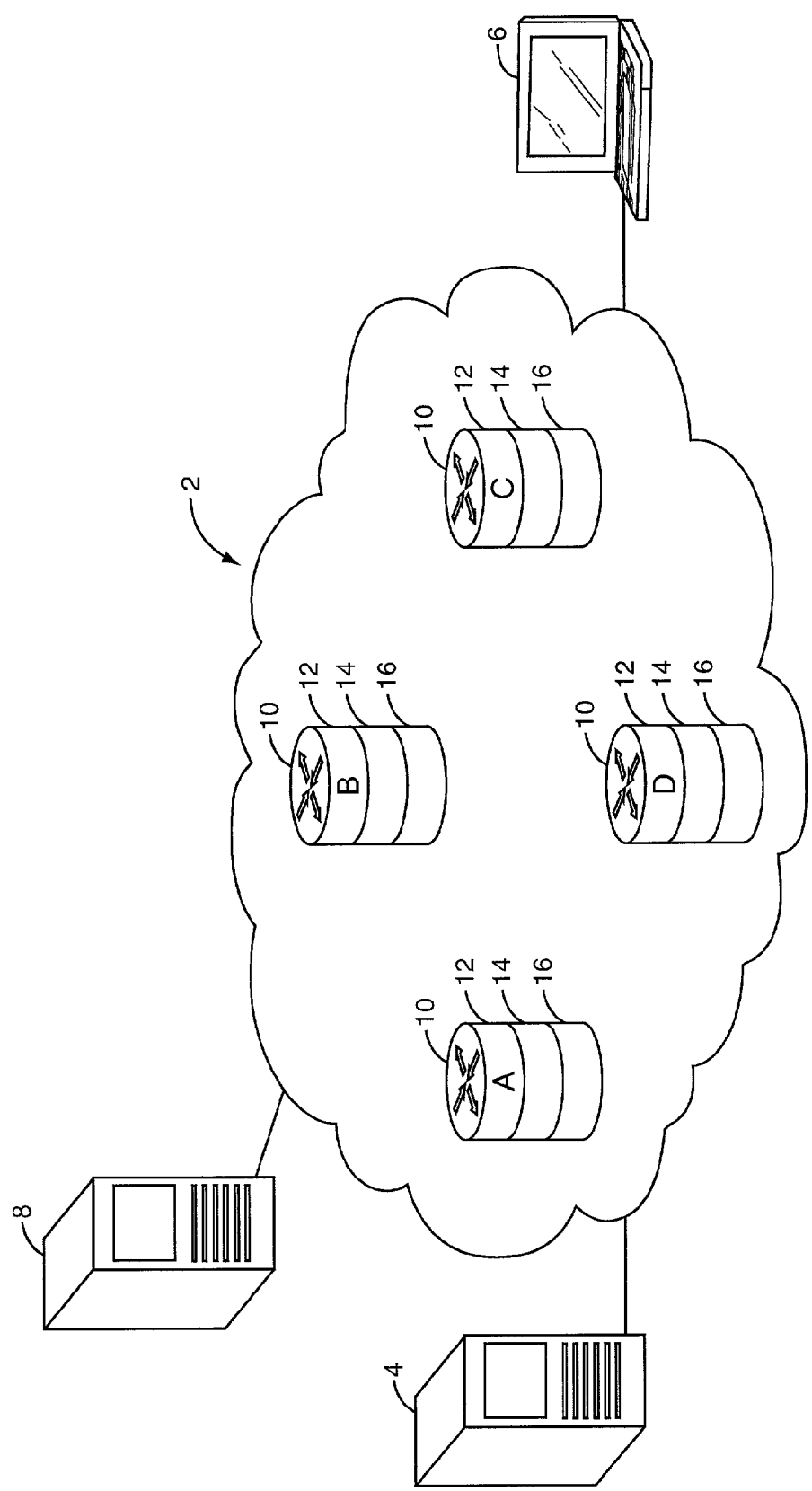
FIG. 1A depicts a network including routing devices capable of providing application level support according to a preferred embodiment of the present invention.

With reference to FIG. 1A, a network 2 is illustrated providing for communications between an application server 4 and a computing device 6, such as a personal computer. A communication server 8 may be provided to facilitate distribution of application level support among routing nodes 10 that are capable of providing the application level support while routing traffic between the application server 4 and the computing device 6. As will be discussed in greater detail below, the routing nodes 10 are capable of providing high-speed routing services in conjunction with processing content carried in the packets between the application server 4 and the computing device 6 during routing.

The routing nodes 10 may take on any type of configuration capable of providing application level support on packet content during routing. However, the preferred embodiment of the invention provides for configuring the routing nodes 10 to include three primary processing planes: a control plane 12, a compute plane 14, and a forward plane 16. Preferably, all incoming packets are received by the forward plane 16 through various ports interacting with a network, such as a packet-switched network. The forward plane 16 is configured to analyze each of the incoming packets and determine where to send each packet. In general, the incoming packets need to be forwarded on toward their final destination, to the control plane 12, or to the compute plane 14.

Preferably, any packet processing provided by the forward plane 16 is limited to manipulating information in one or more headers of the packet as necessary in traditional routing. Packets entering the forward plane 16 that require application level processing, which may entail manipulation of the packet's payload, are directed to the compute plane 14 by the forward plane 16. After processing, the packets are returned to the forward plane 16 for further processing. Additional details of the configuration of the preferred routing node are outlined after a discussion of the concepts of the present invention.

Figure 1B:
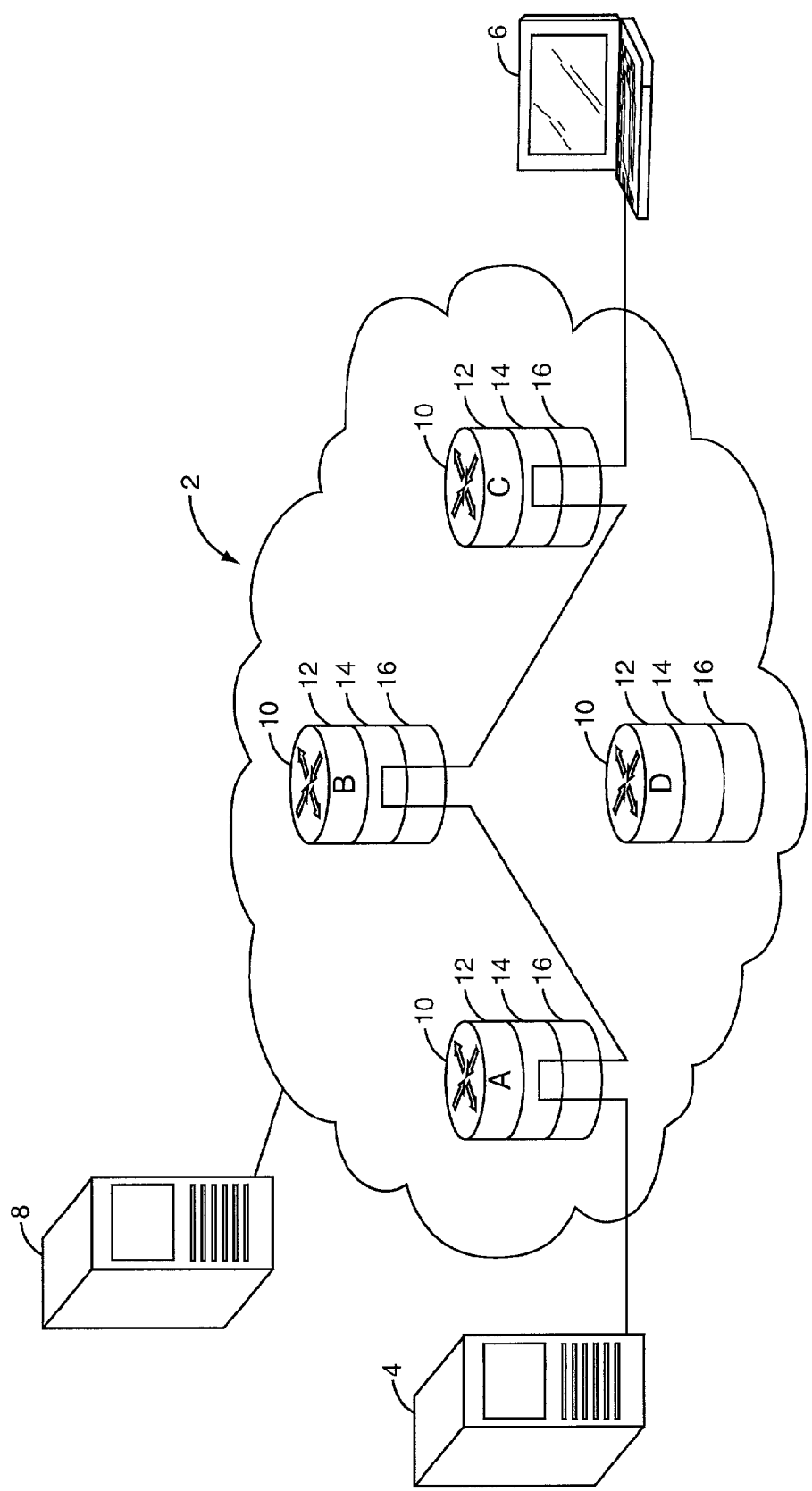
FIG. 1B depicts a first exemplary traffic flow in the network of FIG. 1A wherein the traffic flow receives application level support during routing.
Figure 1C:
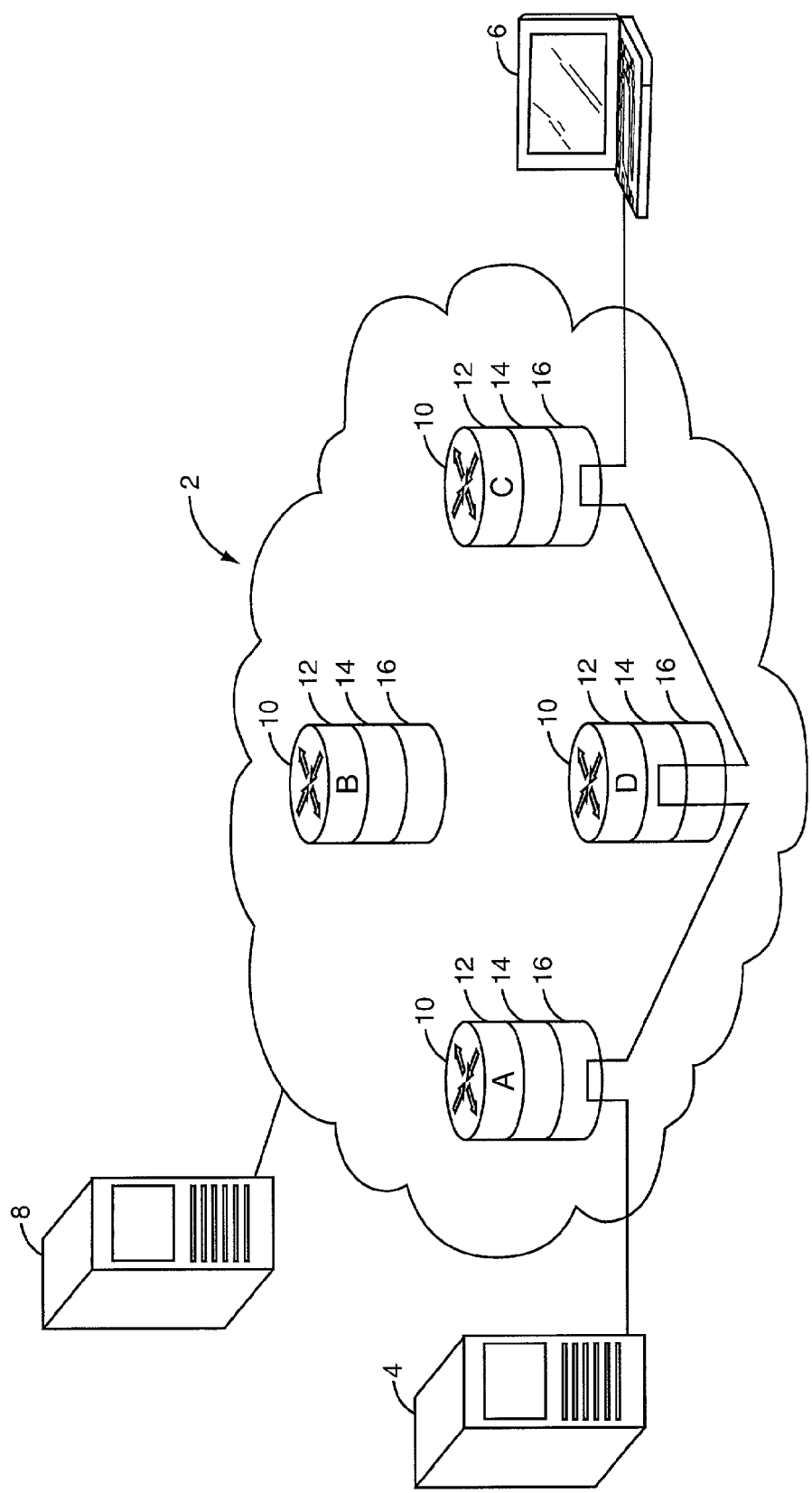
FIG. 1C depicts a second exemplary traffic flow in the network of FIG. 1A wherein the traffic flow receives application level support during routing.

An exemplary traffic flow between the application server 4 and a computing device 6 is shown in FIG. 1B. The routing nodes 10 are illustrated to depict the control plane 12, compute plane 14, and forward plane 16. In the present example, assume that the media flow is routed between the application server 4 and the computing device 6 through routing nodes 10A, 10B and 10C. Further assume that each of the routing nodes 10A, 10B and 10C will provide application level processing on all or select packets constituting the traffic flow. The traffic flow is illustrated by the solid line extending into the compute planes 14 through the forward planes 16 of each of the routing nodes 10A, 10B and 10C.

With the traffic flow depicted in FIG. 1B, application level processing provided by the routing nodes 10A, 10B and 10C may be distributed in a number of ways. For example, each of the routing nodes 10A, 10B and 10C may provide the same type of processing wherein each of the routing nodes 10A, 10B and 10C provides processing for a certain portion of the traffic flow. As such, each of the routing nodes 10A, 10B and 10C may process one third of the traffic or routing node 10A may provide 80 percent of the processing wherein routing nodes 10B and 10C each provide 10 percent of the processing. Alternatively, each of the routing nodes 10A, 10B and 10C may provide a different type of processing on the entire traffic flow. For example, routing node 10A may provide a compression application, routing node 10B may provide an encryption function and routing node 10C may provide an e-commerce related application on the compressed and encrypted traffic flow. Alternatively, a network device or server along the way will be able to do all the computation.

Actual distribution of the application layer support for the traffic flow may be facilitated by the communication server 8 or by a protocol implemented between the routing nodes 10 and perhaps the application server 4 or personal computer 6. If the communication server 8 is used to distribute processing throughout the network 2 among the compatible routing nodes 10, information is collected from each of the routing nodes 10 continuously or on a periodic basis to determine the resources available or the remaining processing capacity of the various routing nodes.

An alternative traffic flow is depicted in FIG. 10 wherein the traffic flow is routed from the application server 4 to the personal computer 6 via routing devices 10A, 10D, and 10C. Notably, routing nodes 10A and 10C simply forward traffic while the routing node 10D provides application level processing. The solid line representing the traffic flow extends into the compute plane 14 of routing node 10D, whereas the traffic flow is solely handled by the forward plane 16 in routing nodes 10A and 10C. The traffic flow may be configured in such a manner because routing nodes 10A and 10C are currently processing other traffic to an extent that they lack sufficient capacity to handle all or any portion of the processing required for the traffic flow depicted. Alternatively, routing nodes 10A and 10C may not be configured to provide the same type of processing as that provided in routing node 10D.

Figure 1D:
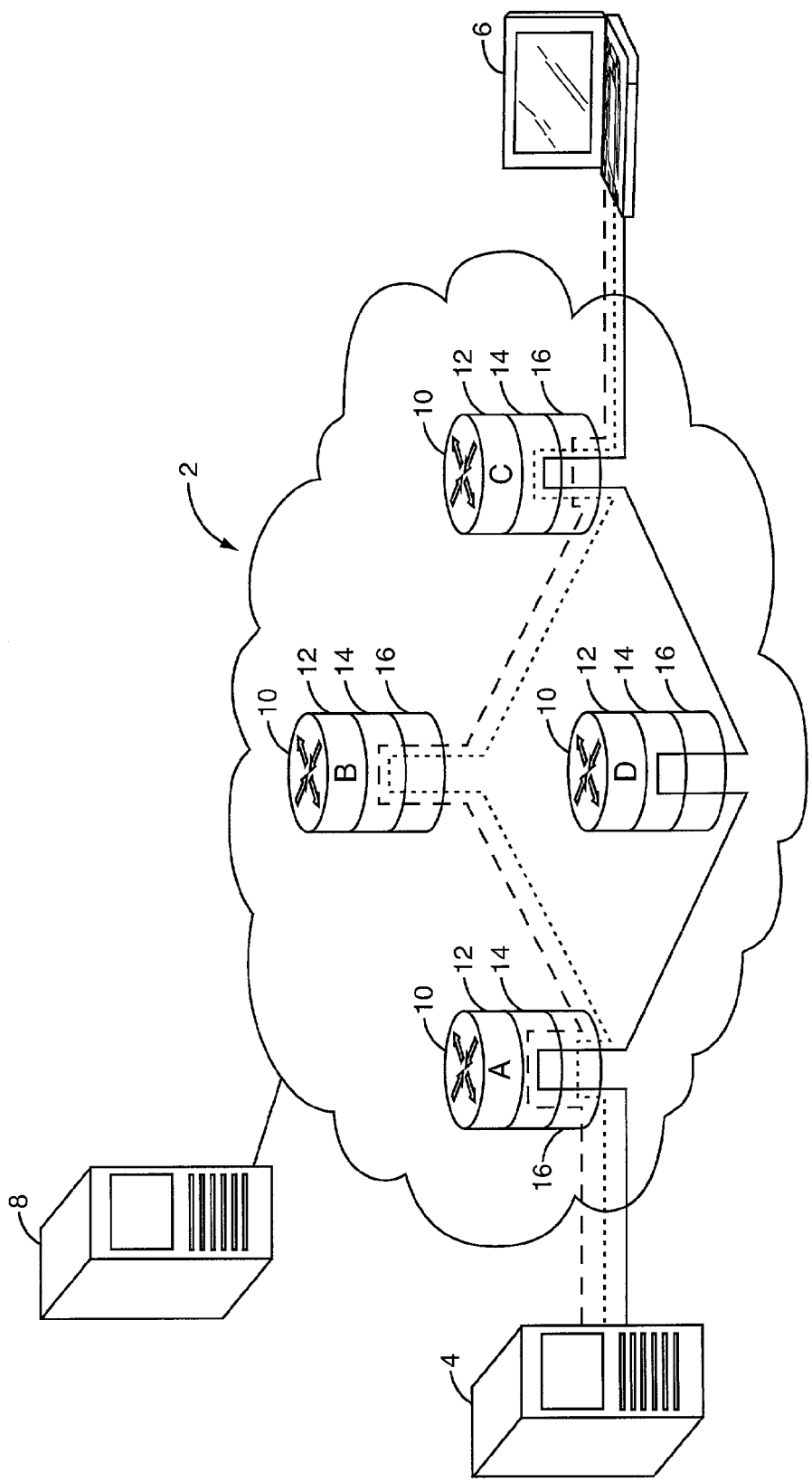
FIG. 1D depicts multiple exemplary traffic flows in the network of FIG. 1A wherein the traffic flows receive application level support during routing.

FIG. 1D depicts three different traffic flows between the application server 4 and the computing device 6. The flows are represented by a solid line, a dotted line, and a dashed line. The traffic flow represented by the solid line is depicted as extending into the compute planes 14 of each of routing nodes 10A, 10D, and 10C. As such, processing for application level support is distributed for that traffic flow between each of the three routing nodes 10A, 10D, and 10C. The traffic flows represented by the dotted and dashed lines are routed through routing nodes 10A, 10B, and 10C, respectively. For the traffic flow represented by the dotted line, application level support is only provided by routing nodes 10B and 10C, wherein routing node 10A operates to simply forward packets between the application server 4 and routing node 10B. The traffic flow represented by the dashed line receives application level processing by routing nodes 10A and 10B, wherein routing node 10C merely forwards the packets between 10B and the computing device 6.

Preferably, the routing and distribution of application level support for each traffic flow is distributed to provide efficient routing and processing. For example, if the traffic flow represented by the solid line was the first of the three traffic flows initiated, the application level support was distributed evenly between routing nodes 10A, 10D, and 10C. If the traffic flow represented by the dashed line was the second flow initiated, the application level support for the traffic flow may have been evenly distributed between routing nodes 10A and 10B. When the traffic flow associated with the dotted line was initiated, a decision may have been made to avoid providing application level support by routing node 10A, due to its handling of the traffic flows represented by the solid and dashed lines. Thus, for the traffic flow represented by the dotted line, routing node 10A only forwards the traffic, wherein routing nodes 10B and 10C were less congested and had sufficient capacity to handle the application level support.

Figure 2:
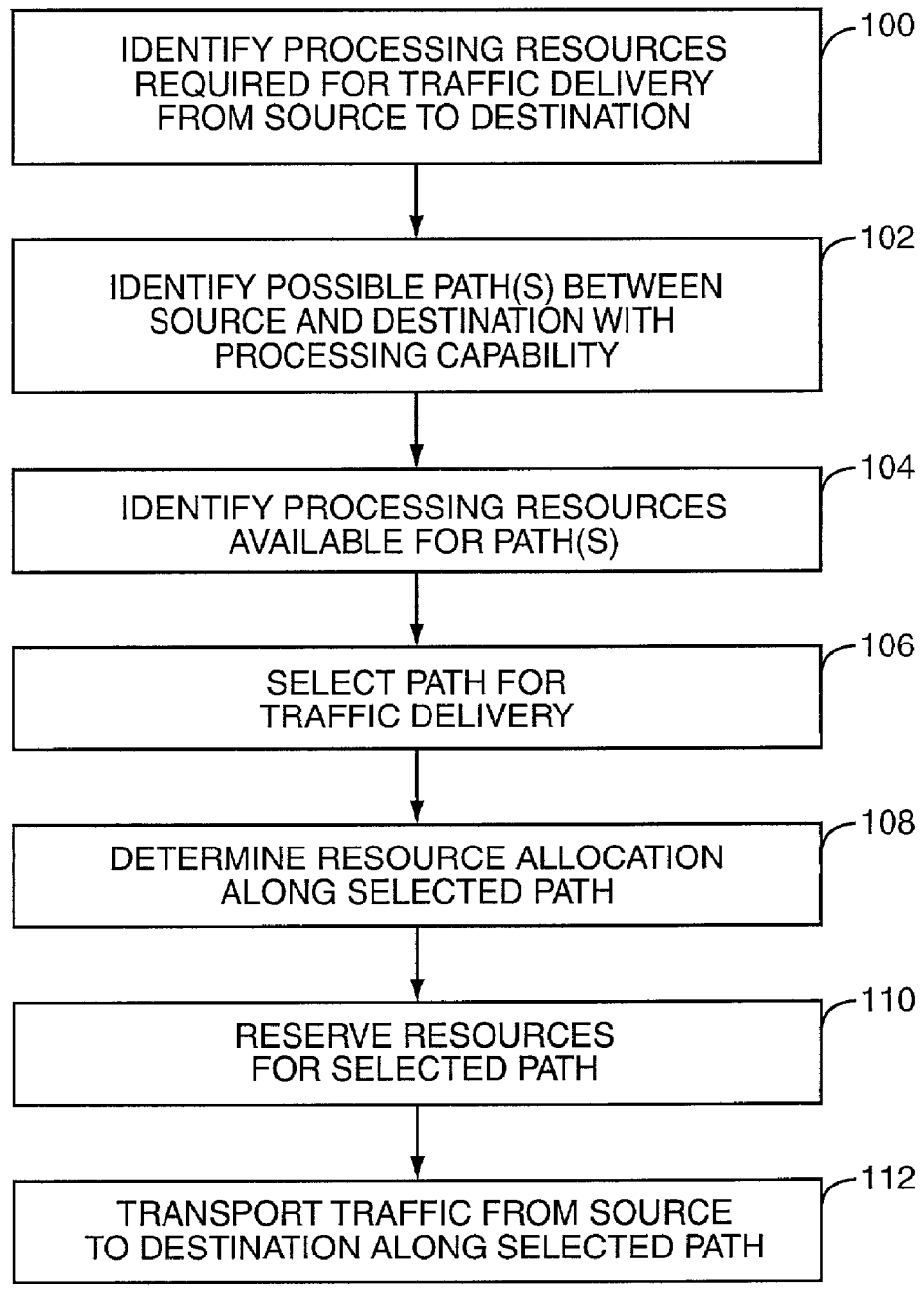
FIG. 2 is a flow diagram outlining the basic flow for distributing application level processing for traffic flow during routing according to a preferred embodiment of the present invention.

Notably, distribution of the processing associated with application level support may be distributed based on available resources or in an effort to maximize routing or processing speeds by distributing the processing among multiple routing nodes 10. The basic process of distributing application level support during routing is outlined in FIG. 2. Preferably, the process will begin by identifying the necessary processing resources required for delivery of traffic from a source to the destination (block 100). As in the network 2 depicted in FIGS. 1A through 1D, multiple routing paths will likely exist. Among these multiple paths, paths capable of providing the requisite application level support during routing between the source and destination are identified (block 102). Within the identified paths, available processing resources are identified to assist in distributing the application level support (block 104).

A routing path for delivering traffic between the source and destination is selected (block 106), preferably based on available resources and perhaps based on other network conditions bearing on the processing and routing performance for the particular traffic flow, for the network in general, or a combination thereof. The ultimate goal is to provide the necessary application level support during routing and to route the traffic to meet quality and/or speed requirements. For example, streaming media traffic requiring application level support may need the traffic delivered with minimal packet loss and at a given rate. Other traffic flows may require less speed and more accuracy. The distribution of the application level support will facilitate meeting the routing and processing demands of the traffic flows.

Preferably, once the path is selected for traffic delivery, the necessary resource allocation for providing the application level support along the selected path is determined (block 108). In essence, the distribution of the application level support is determined. The routing nodes needed to provide the application level support are determined, and the amount of application level support provided by each of the routing nodes 10 is defined. Based on this distribution, resources may be reserved in the selected routing nodes 10 to ensure each of the routing nodes have the capacity and the ability to provide the application level support for the traffic flow (block 110). Once the resources are reserved, traffic for the traffic flow may be transported from the source to the destination along the selected path (block 112).

During transport, the selected routing nodes 10 will provide the allocated application level support and routing functions necessary for delivery. The routing nodes 10 may cooperate with one another alone or in combination with a communication server 8 to communicate capacity information using an acceptable protocol. The capacity information is used to determine whether a given flow may be processed in a node or nodes within the routing path. Processing is allocated and the capacity is reserved for the allocated processing prior to initiating traffic flow.

Figure 3:
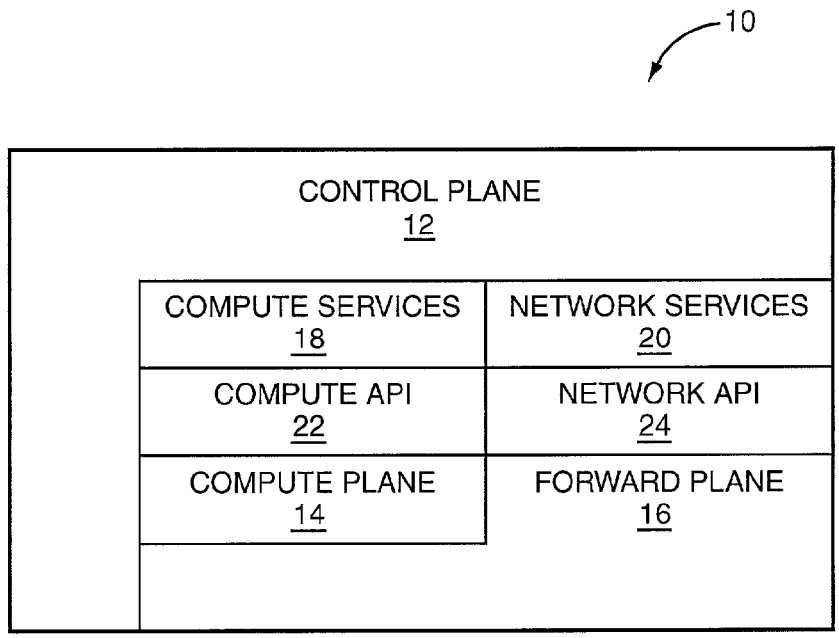
FIG. 3 depicts a preferred architecture for a routing node constructed according to a preferred embodiment of the present invention.

With reference to FIG. 3, a routing node 10 is illustrated according to a preferred embodiment of the present invention. As noted above, the routing node 10 may be divided into three primary processing planes: a control plane 12, a compute plane 14, and a forward plane 16. Preferably, all incoming packets are received by the forward plane 16 through various ports interacting with a network, such as a packet-switched network. The forward plane 16 is configured to analyze each of the incoming packets and determine where to send each packet. In general, the incoming packets need to be forwarded on toward their final destination, to the control plane 12, or to the compute plane 14.

Figure 4:
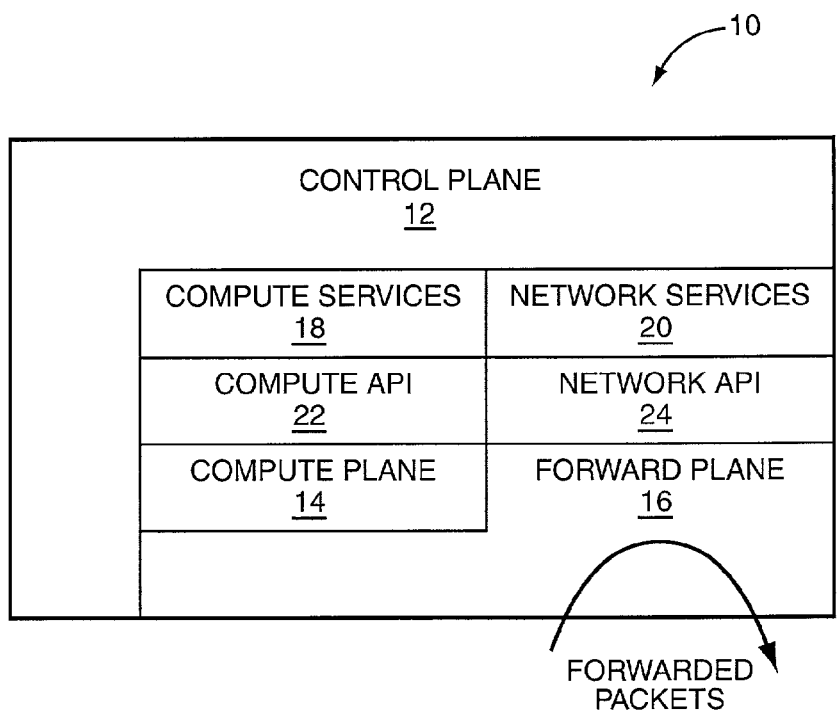
FIG. 4 illustrates the forwarding path of packets processed within the forward plane of the architecture shown in FIG. 3.

Depending on the extent or nature of any necessary manipulation of the packet, the packet may be processed by the forward plane 16 and forwarded to the next-hop routing node or final destination. Preferably, any packet processing provided by the forward plane 16 is limited to manipulating information in one or more headers of the packet as necessary in traditional routing. As depicted in FIG. 4, packets requiring only traditional routing are maintained in the forward plane 16 for processing and immediately forwarded to the next-hop routing node or destination.

Figure 5:
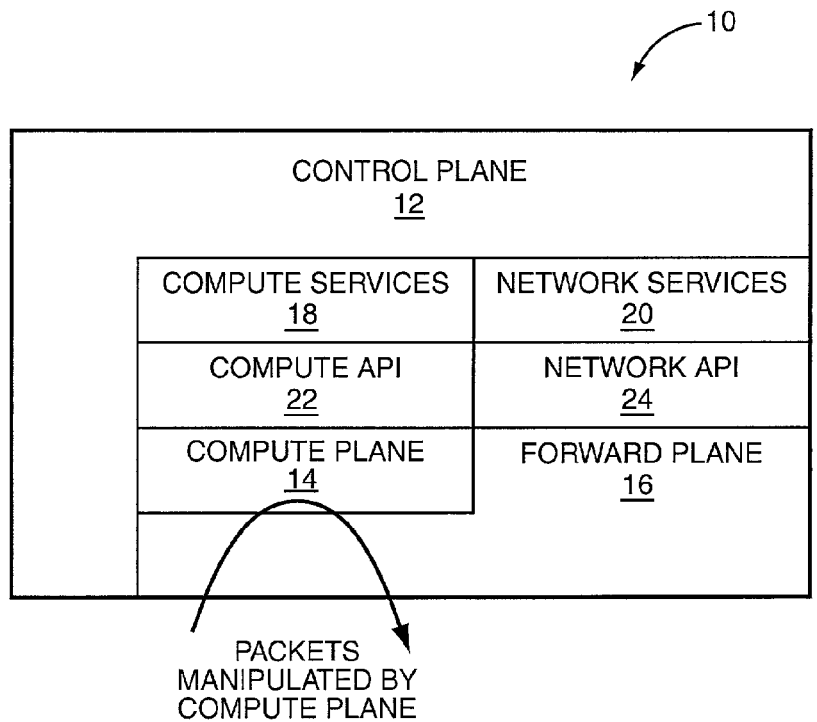
FIG. 5 illustrates the forwarding path of packets processed by the compute plane of the architecture shown in FIG. 3.

Packets entering the forward plane 16 that require application level processing, which may entail manipulation of the packet's payload, are directed to the compute plane 14 by the forward plane 16. As depicted in FIG. 5, these packets are passed through the forward plane 16 to the compute plane 14 for processing and then sent back to the forward plane 16, which will forward the processed packet to the next-hop routing node or final destination.

Although additional detail is provided below, the compute plane 14 provides application level processing, and any necessary payload manipulation required by such processing. During processing by the compute plane 14, the payload may be reviewed, removed, modified, and repacked as directed by any number of applications. The routing node 10 preferably supports programming and unique configuration of the compute plane 14 and the forward plane 16.

Any number of applications may be supported through the compute plane 14. For example, Internet Protocol (IP) security and secure socket layer (SSL) applications may be implemented in a routing node 10 using the compute plane 14. Various types of multimedia applications are made possible, alone or in combination with other applications. Further, incorporating a high-speed compute plane 14 for application specific packet processing enables streaming applications and minimizes or eliminates the need for buffering. The compute plane 14 is capable of implementing virtually any type of application, ranging from carrying out mathematical operations on payloads to implementing compression and encryption algorithms. The compute plane 14 may also help facilitate high-speed firewalls acting as a single point of entry or distributed to provide multiple points of entry. Typically, the compute plane 14 operates on layer four and higher protocols that are typically application related.

Figure 6:
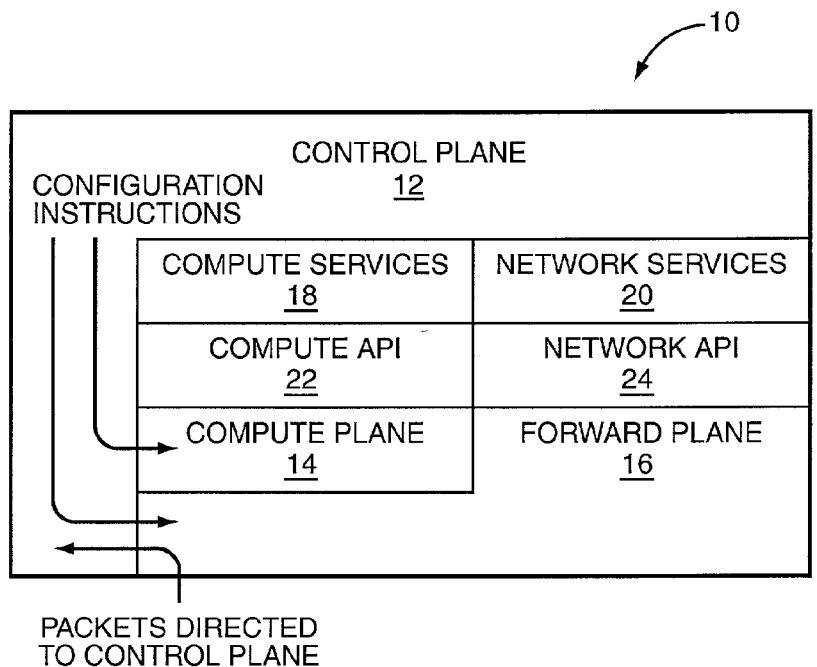
FIG. 6 illustrates the forwarding path of packets directed to the control plane and the path of instructions for configuring the compute plane and forward plane from the control plane according to a preferred embodiment of the present invention.

In addition to traditional forwarding of incoming packets and directing packets to the compute plane 14 for processing, the forward plane 16 may direct selected incoming packets to the control plane 12 for basic communications with the routing node 10 as shown in FIG. 6. In essence, the control plane 12 provides overall control and configuration for the routing node 10, and in particular, for the compute plane 14 and the forward plane 16. This control may range from running diagnostics to setting configurations for the compute plane 14 and the forward plane 16. These settings may dictate the type of processing to carry out on the incoming packets and which plane handles the processing.

Returning now to FIG. 3, the routing node 10 may support various services, which are groups of code or objects that implement specific functionality. Preferably, these services use Java code and may be divided into compute services 18 related to the compute plane 14, and network services 20 related to the operation of the forward plane 16. Each of these services cooperates with the corresponding compute plane 14 and forward plane 16 via a compute application program interface (API) 22 and network API 24, respectively. The network API can be CPIX, IEEE 1520, the IETF's APIs, or other propriety APIs. Since the services are preferably Java compatible, the compute API 22 and network API 24 may specify interfaces for Java applications to control the respective compute plane 14 and forward plane 16.

Preferably, the network API 24 can be used to instruct the forward plane 16 to alter packet processing through the installation of hardware or software filters that facilitate forwarding rules. These filters execute actions specified by a defined filter policy. Typically, these filters can be based on combinations of fields in the machine address, IP address, and transport headers. The filters may also be configured to trigger on a payload as well. The filter policy can define where the matching packets are delivered and can also be used to alter the packet content as noted above.

Typical packet delivery options include discarding matching packets and diverting matching packets to the control plane 12 or compute plane 14 based on the filter policy. With the present invention, a high-speed compute plane 14 is provided to handle such processing. Additionally, packets may be "copied" to the control or compute planes 12, 14 or may be mirrored to a selected interface. Packets may also be identified as being part of high-priority flow; these packets can be placed in a high-priority queue and delivered accordingly. For example, packets can be marked differentially for DiffServ or MPLS marking. As noted, the filter policy can also cause packet and header content to be selectively altered for most of these operations. The particular plane handling the processing is capable of re-computing IP header check sums at high speeds when and if the IP header or payload is changed.

In the present invention, all control plane computations, such as installing new routing tables, ARP cash tables, Filter tables, or parsing a new Internet Control Message Protocol (ICMP) message type, are easily accommodated through the network API 24. Through the network API 24, the forward plane 16 may provide a number of services. The applications are typically contained within the forward plane 16 and will not require additional processing by the compute plane 14 for traditional operation. The following list of services is merely exemplary and not intended to limit the scope of the present invention. The various functions provided by the forward plane 16 relate to analyzing incoming packets, manipulating packet headers, if necessary, and forwarding the packets to the next-hop or destination at high speeds.

The present invention supplements these abilities with high-speed, preferably line rate, processing capabilities at an application level. As noted, the compute plane 14 is preferably used to manipulate packet data or payloads beyond layer three or four protocols that provide application layer support. Thus, instead of analyzing or modifying the header on a packet, data analysis and manipulation associated with application layers in the packet is possible in the compute plane 14.

The compute plane 14 provides application support efficiently and at high speeds without impacting the traditional routing speeds of the forward plane 16. Further, the application layer processing is provided at much faster speeds in the compute plane 14 than would be possible in the control plane 12. In addition to increased routing speeds and efficiency for application support, the compute plane 14 allows significant configuration of routing nodes 10 to facilitate any number of applications or combinations thereof.

Figure 7:
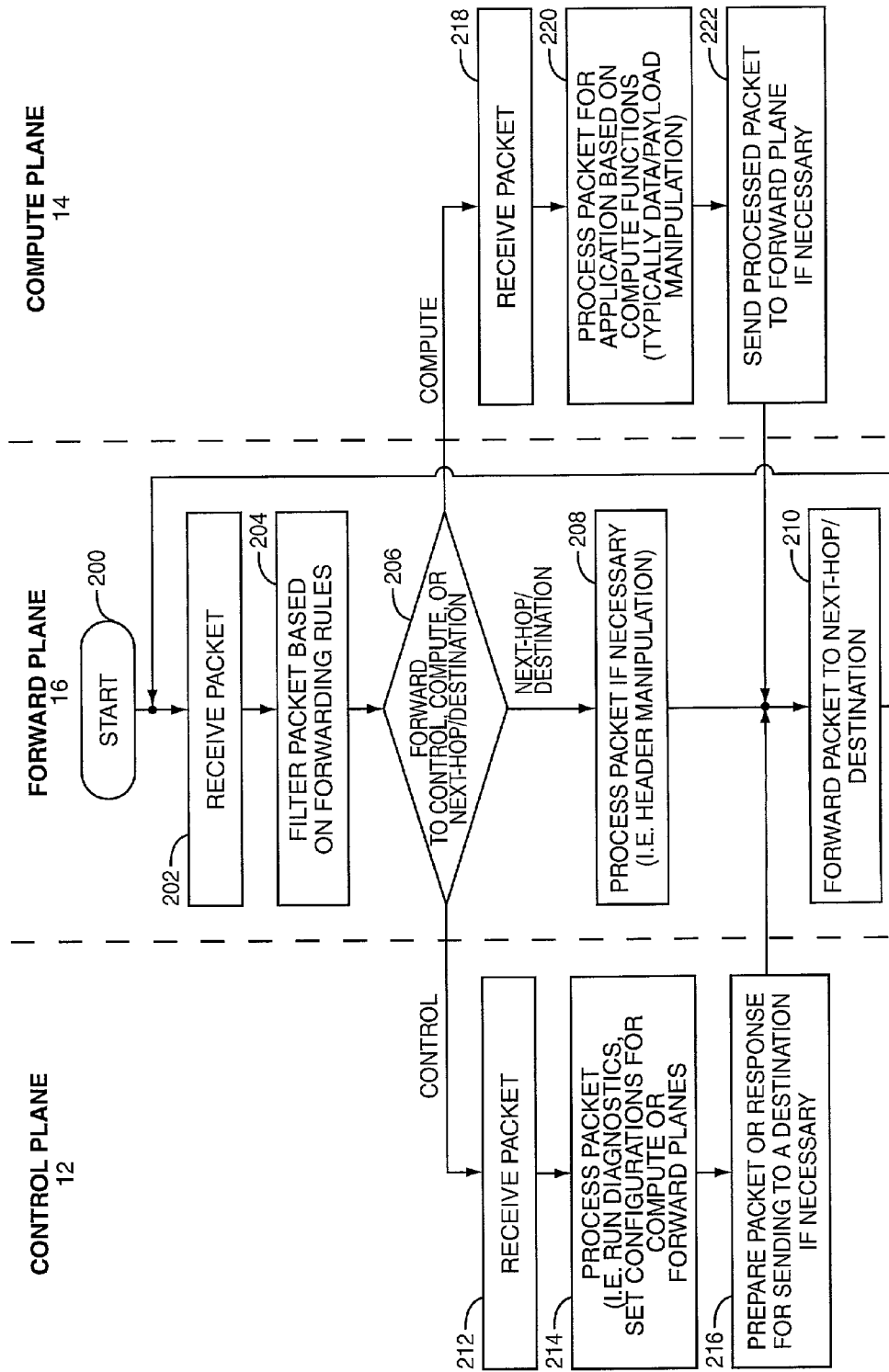
FIG. 7 is a flow diagram outlining the basic flow for processing packets in the control plane, compute plane, and/or the forward plane according to a preferred embodiment of the present invention.

Overall interaction between the control plane 12, compute plane 14, and forward plane 16 is outlined in the flow diagram of FIG. 7. Notably, the preferred processing for each of the three planes is illustrated. The process begins (block 200) with the forward plane 16 receiving all incoming packets regardless of whether the packets are intended for the routing node directly or simply sent to the routing node for routing. When a packet is received (block 202), the forward plane 16 will filter the packet based on the forwarding rules (block 204).

In general, the forwarding rules will dictate whether the packet is forwarded to the control plane 12, compute plane 14, or sent to the next-hop or destination after processing by the forward plane 16 (step 206). As discussed above, packets directed to the routing node 10, such as those used for diagnostics or to set configurations, are directed to the control plane 12. Packets requiring application level processing are sent to the compute plane 14. Packets for which the forward plane 16 can handle all processing are simply processed in the forward plane 16 and forwarded to the next-hop or destination. Typically, packets processed by the compute plane 14 and forward plane 16 are those requiring routing.

Assuming that the packet is one capable of being handled solely by the forward plane 16, the packet is processed accordingly in the forward plane 16 (block 208) and forwarded to the next-hop or destination (block 210). As noted, packet processing in the forward plane 16 is typically limited to header analysis and manipulation.

If the packet received by the forward plane 16 is determined to be one directed to the control plane 12 based on the forwarding rules (block 206), the packet is received by the control plane 12 (block 212) and processed by the control plane 12 accordingly (block 214). As noted, packets intended for the control plane 12 may facilitate diagnostic or control instructions for the compute plane 14, such as instructions to set particular configurations for the compute or forward planes 14, 16. For example, the compute plane 14 may receive information for establishing the forwarding rules for the forward plane 16 as well as configure the particular processing carried out by the compute plane 14 or the forward plane 16.

When the control plane 12 needs to respond to communications or deliver instructions to another network device, the control plane 12 will prepare a suitable packet or response for sending to a select destination (block 216). Preferably, the packet or packets associated with an outgoing communication from the control plane 12 are sent to the forward plane 16 wherein the packet or packets are forwarded to the next-hop or destination (block 210).

If the packet received by the forward plane 16 from the network is one requiring application level support and the forwarding rules direct the packet to the compute plane 14 (block 206), the packet is routed to the compute plane 14 accordingly. As described in further detail below, the forwarding rules may dictate where to send the packet within the compute plane 14 or how the packet will be processed once it is received by the compute plane 14. In general, the compute plane 14 receives the packet (block 218) and processes the packet as dictated by the application (block 220). As noted, preferably the application data or payload is processed in the compute plane 14.

In particular, the compute plane 14 is configured to carry out select functions to facilitate application level processing, which results in data or payload manipulation (block 220). The processing may require restructuring or re-packetizing the data or payload information depending on the particular application. Certain applications may simply process individual packets wherein other applications may require various types of data or payload reconstruction. For example, information in one packet may be used to create multiple new packets, or the information in multiple packets may be used to create a single packet. Regardless of the processing, the packets processed or provided by the compute plane 14 are sent to the forward plane 16 (block 222) for forwarding to the next-hop routing device or destination. As such, the forward plane 16 will receive packets from the compute plane 14 and forward the packet to the next-hop or destination (block 210).

With regard to distributing processing among routing nodes 10, the control planes 12 of the routing nodes 10 will preferably cooperate with other routing nodes 10 or with the communication server 8. The communications may provide information bearing on the processing capacity available and the type of application level support provided by the particular routing node 10. Based on this information, resources may be allocated and reserved as necessary to handle forwarding provided by the forward plane 16 and processing provided by the compute plane 14. Those skilled in the art will recognize various techniques and protocols, such as RSVP, or COPS capable of facilitating allocation and reservation of resources for traffic flows. RSVP is a resource reservation setup protocol for the Internet. Its major features include: (1) the use of "soft state" in the routers, (2) receiver-controlled reservation requests, (3) flexible control over sharing of reservations and forwarding of subflows, and (4) the use of IP multicast for data distribution. For additional information regarding RSVP, please see the Internet Engineering Task Force's RFCs 2205 through 2210 and 2748, which are incorporated herein by reference in their entirety. The communication server 8 may cooperate or may be one of various types of policy servers, call servers, and the like.

Figure 8:
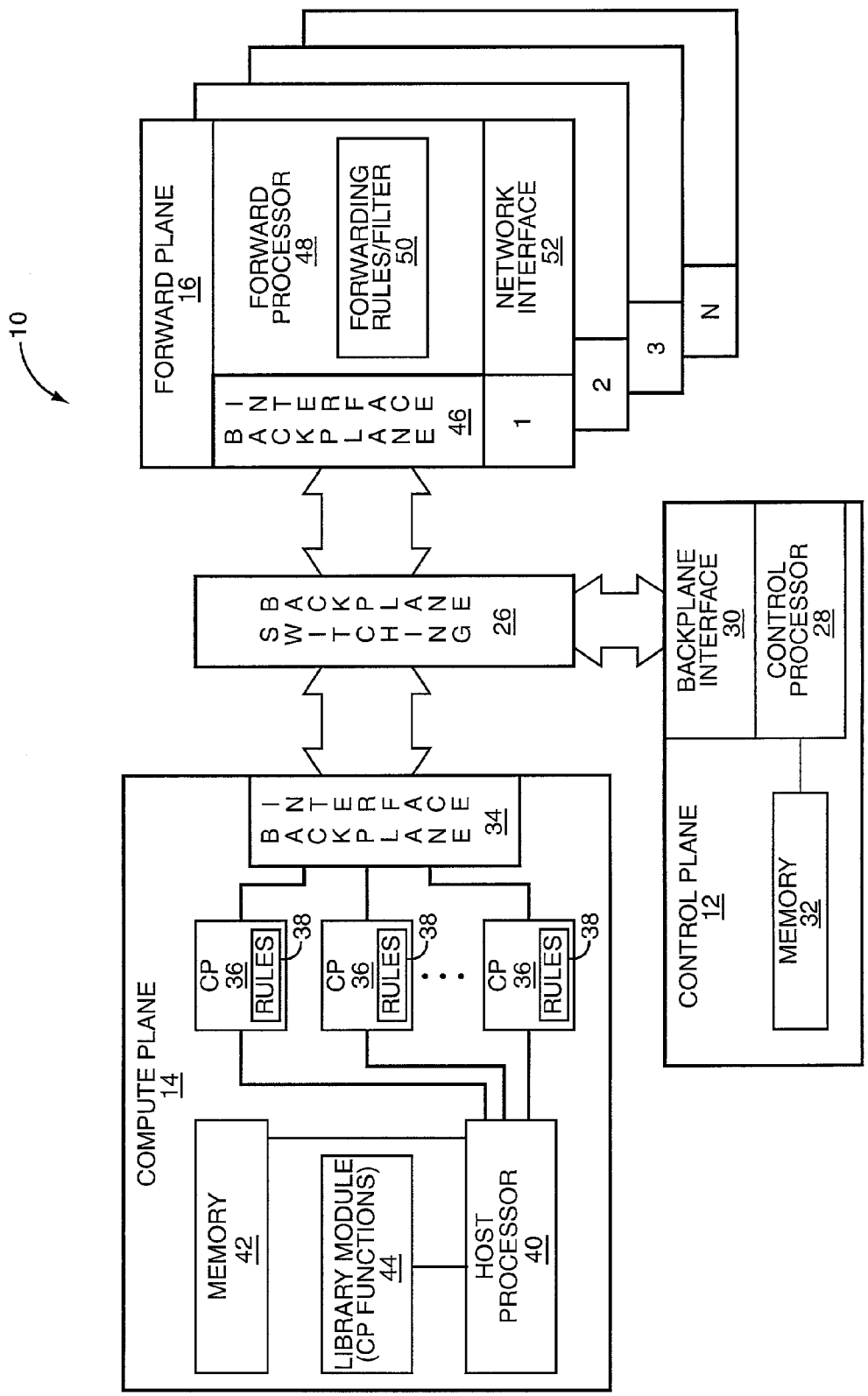
FIG. 8 is a block schematic of a preferred configuration of a routing node according to the present invention.

A block diagram of a preferred configuration of the routing node 10 is depicted in FIG. 8. Preferably, each of the control plane 12, compute plane 14 and forward plane 16 includes dedicated processing capability and is in communication with the other planes through a switching backplane 26. As such, the control plane 12 will include a control processor 28 associated with a backplane interface 30 coupled to the switching backplane 26 and will include sufficient memory 32 for storing the necessary instructions and data for operation.

The compute plane 14 includes a backplane interface 34 in communication with one or more high-speed compute processors (CP) 36. These compute processors 36 will include or be able to carry out select processes, rules or functions 38. Further, the compute processors 36 may stand alone or be controlled in part by a host processor 40. Preferably, the host processor 40 is associated with sufficient memory 42 for storing the necessary data and instructions for operation. The host processor 40 may also be associated with a library module 44, which may store various types of compute processor functions used to configure the function or rules 38 of the compute processors 36. The speed of the host processor 40 is not as critical as insuring that the compute processors 36 are capable of high-speed processing.

In an effort to maximize the processing speeds, the compute processors 36 may be implemented using traditional central processing units (CPUs), field programmable gate arrays (FPGAs); application specific integrated circuits (ASICs); digital signal processing (DSP) components network processors; or a combination thereof. Preferably, each compute processor 36 will include a processor and an FPGA or ASIC cooperating to maximize processing throughput. The processor facilitates configuration of the cooperating FPGA or ASIC, while the FPGA or ASIC processes the packets. Notably, the compute processor 36 is a generic name for any one or combination of hardware, firmware or software capable of providing the high-speed application processing required in the compute plane 14. Those skilled in the art will appreciate the numerous techniques available to provide high-speed processing.

The compute processor 36 is configured to carry out select functions or rules 38 at or close to wire-line speeds on the selected packets directed to the compute plane 14 from the forward plane 16. Importantly, the compute processors 36 may provide a combination of functions for varying applications or may be configured wherein each compute processor 36 carries out a dedicated function or rule 38. In the latter case, different compute processors 36 may facilitate different processing based on the function or rules 38. As such, the packets sent to the compute plane 14 from the forward plane 16 are directed to a select compute processor 36 capable of handling the application associated with the given packet.

The forward plane 16 includes a backplane interface 46 for communicating with the switching backplane 26. The backplane interface 46 of the forward plane 16 is associated with a forward processor 48 capable of implementing select forwarding rules 50 that facilitate packet filtering and delivery to the control plane 12, compute plane 14, and the next-hop or destination. The forward processor 48 provides the typical routing processing and functions in traditional fashion for those packets that do not require the application processing of the compute plane 14. The forward processor 48 is also associated with a network interface 52, which is coupled to the packet-switched network for receiving and sending packets.

The network interface 52 may be any type of network interface, including a 10 Base T, 100 Base T, gigabit Ethernet, 10 Giga, POS packet Over SONET, ATM, OC-3, OC-12, OC-48, OC-192, or other interfaces. As depicted, given the necessary volume of traffic handled by the routing node 10, the forward plane 16 may be provided on multiple cards, all of which interface with the switching backplane 26. These cards can be passive or active, and may include their own forward processors 48 and network interfaces 52. Further, the compute plane 14 may be implemented on multiple cards in a fashion similar to that depicted for the forward plane 16.

As with the compute processors 36 in the compute plane 14, the forward processors 48 require high-speed processing capability. As such, the forward processor 48 is also a CPU, ASIC, FPGA, DSP device, network processor (NP), or combination thereof. Preferably, as with the compute processors 36, the forward processors 48 are programmable in the sense that the forwarding rules 50 and basic processing configurations are programmable. Preferably, the compute processors 36 and the forward processors 48 are programmable and can be programmed under the control of the control plane 12.

In essence, it is preferable for the control plane 12 to be able to establish the forwarding rules 50 and configure processing for the forward plane 16. Similarly, the control plane 12 is preferably capable of setting the functions and rules 38 implemented by the compute processors 36 in the compute plane 14. Those skilled in the art will appreciate the tremendous flexibility in programming and configuring the compute plane 14 and the forward plane 16.

For example, assume that for a given media stream application level processing is required for type A packets and basic forwarding is required for type B packets. Configuration instructions may be sent to the routing node 10 defining the type A and B packets within the media stream and the processing function to provide on the type A packets. The configuration instructions may be sent in one or more packets, which will be forwarded to the control plane 12 by the forward plane 16. Upon receipt, the control plane 12 will configure the forward plane 16 to recognize the type A and B packets in the media stream and forward the type A packets to the compute plane 14 and the type B packets on to the next-hop or the final destination.

Those skilled in the art will recognize improvements and modifications to the disclosed embodiments of the present invention. For example, the routing devices of the present invention may be any number of network devices, including routers, switches, gateways, aggregation devices, network distribution devices, core routers, wireless base stations, wireless access points, and multiplexors (electrical and optical). All such improvements and modifications are considered within the scope of the concepts disclosed herein and the claims that follow.

What is claimed is:

1. A method for distributing processing among routing nodes capable of providing application level support during routing, the method comprising:
    configuring the routing nodes to include a control plane, a compute plane and a forward plane;
    identifying processing resources required to provide application level support during routing for select traffic;
    selecting at least one routing node capable of providing the processing resources required to provide the application level support for the select traffic in the compute plane of the at least one routing node; and
    routing the select traffic through the at least one routing node capable of providing the processing resources required to provide the application level support,
    wherein the at least one routing node provides the application level support for the select traffic while routing the select traffic.

2. The method of claim 1 wherein the at least one routing node is at least one of a plurality of routing nodes that can provide the application level support for the select traffic and the selecting step further comprises determining the at least one routing node from the plurality of routing nodes to provide the application level support in a manner to balance processing load among the plurality of routing nodes.

3. The method of claim 1 wherein the at least one routing node is at least one of a plurality of routing nodes that can provide the application level support for the select traffic and the selecting step further comprises determining the at least one routing node from the plurality of routing nodes based on available processing capacity of the at least one routing node to provide the application level support.

4. The method of claim 1 wherein the at least one routing node is at least one of a plurality of routing nodes that can provide the application level support for the select traffic and the selecting step further comprises determining the at least one routing node from the plurality of routing nodes based on available processing capacity of the plurality of routing nodes and the at least one routing node to provide the application level support.

5. The method of claim 1 wherein the selecting step selects a plurality of routing nodes through which to route the select traffic to distribute the application level support for the select traffic and the routing step routes the select traffic to facilitate distribution of the application level support such that processing for the application level support is distributed among the plurality of routing nodes while routing the select traffic.

6. The method of claim 5 wherein the selecting step further comprises selecting the plurality of routing nodes within one routing path such that all of the select traffic is routed through each of the plurality of routing nodes and processing for the application level support is distributed among the plurality of routing nodes while routing the select traffic.

7. The method of claim 5 wherein the selecting step further comprises selecting the plurality of routing nodes within different routing paths such that a different portion of the select traffic is routed through each of the plurality of routing nodes and processing for the application level support is distributed among the plurality of routing nodes while routing the select traffic.

8. The method of claim 7 wherein the selecting step further comprises selecting the plurality of routing nodes wherein at least two of the plurality of routing nodes are within one of the different routing paths such that processing for the application level support for the portion of the select traffic routed through the at least two of the plurality of routing nodes is distributed between the at least two of the plurality of routing nodes.

9. The method of claim 1 wherein the selecting step further comprises:
    identifying possible routing paths between a source and a destination for the select traffic, each of the possible routing paths including the at least one routing node capable of providing the processing resources required to provide the application level support for the select traffic;
    identifying a capacity of the at least one muting node in the possible routing paths to provide the processing resources; and
    determining at least one of the possible routing paths through which to route the select traffic based on the capacity of the at least one routing node in the possible routing paths to provide the processing resources.

10. The method of claim 9 further comprising allocating resources of the at least one routing node along the at least one of the possible routing paths to provide the processing for the application level support while routing.

11. The method of claim 1 wherein the selecting step further comprises:
    identifying possible routing paths between a source and a destination for the select traffic, each of the possible routing paths including at least one routing node capable of providing the processing resources required to provide the application level support for the select traffic;
    identifying capacities of a plurality of routing nodes among the possible routing paths to provide the processing resources; and
    determining at least one of the possible routing paths through which to route the select traffic based on the capacity of the plurality of routing nodes in the possible routing paths to provide the processing resources.

12. The method of claim 11 wherein the selecting step further comprises distributing processing among the plurality of routing nodes to provide the application level support for the select traffic.

13. The method of claim 1 wherein the at least one routing node provides the application level support for the select traffic while routing the select traffic by manipulating a payload of a packet within the select traffic.

14. The method of claim 1 wherein the at least one routing node provides the application level support for the select traffic while routing the select traffic by providing secure socket layer (SSL) applications.

15. The method of claim 1 wherein the at least one routing node provides the application level support for the select traffic while routing the select traffic by providing Internet Protocol security applications.

16. The method of claim 1 wherein the at least one routing node provides the application level support for the select traffic while routing the select traffic by operating on layer four and higher protocols within packets within the select traffic.

17. A method for distributing processing among multiple routing devices capable of providing application level support, the method comprising:
determining processing resources necessary for the application level support of traffic to be routed;
monitoring processing capacity available on a plurality of routing nodes capable of providing the application level support and routing the traffic, wherein each of the plurality of routing nodes is configured to include a control plane, a compute plane and a forward plane;
identifying at least two of the plurality of routing nodes having combined processing capacity in the respective compute planes to provide the application level support necessary for the traffic to be routed; and
routing the traffic in a manner allowing the at least two routing nodes to provide the processing for the application level support.

18. The method of claim 17 further comprising determining how to distribute the processing for the application level support among the at least two routing nodes based on the processing resources necessary for the application level support.

19. The method of claim 18 further comprising reserving sufficient resources of the at least two routing nodes prior to routing to the at least two routing nodes to provide the processing capacity for the application level support necessary for the traffic.

20. A routing element facilitating distribution of application level processing during routing comprising a control system adapted to:
determine processing resources necessary for application level support of traffic to be routed;
monitor processing capacity available on a plurality of routing nodes capable of providing the application level support and routing the traffic, wherein each of the plurality of routing nodes is configured to include a control lane, a compute plane and a forward plane;
identify at least two of the plurality of routing nodes having combined processing capacity in the respective compute planes to provide the application level support necessary for the traffic to be routed; and
facilitate routing the traffic in a manner allowing the at least two routing nodes to provide the processing for the application level support.

21. The routing element of claim 20 wherein said control system is further adapted to determine how to distribute the processing for the application level support among the at least two routing nodes based on the processing resources necessary for the application level support.

22. The routing element of claim 21 wherein said control system is further adapted to reserve sufficient resources of the at least two routing nodes prior to routing to the at least two routing nodes to provide the processing capacity for the application level support necessary for the traffic.

23. A system for distributing processing among routing nodes capable of providing application level support during routing, the system wed comprising:
means for identifying processing resources required to provide the application level support during routing for select traffic;
means for selecting at least one routing node capable of providing the processing resources required to provide the application level support for the select traffic, wherein the at least one routing node is configured to include a control plane, a compute plane and a forward plane and the application level support is provided in the compute plane; and
means for routing the select traffic through the at least one routing node capable of providing the processing resources required to provide the application level support,
wherein the at least one routing node provides the application level support for the select traffic while routing the select traffic.

24. The system of claim 23 wherein the at least one routing node is at least one of a plurality of routing nodes that can provide the application level support for the select traffic and the means for selecting is capable of determining the at least one routing node from the plurality of routing nodes to provide the application level support in a manner to balance processing load among the plurality of routing nodes.

25. The system of claim 23 wherein the at least one routing node is at least one of a plurality of routing nodes that can provide the application level support for the select traffic and the means for selecting is capable of determining the at least one routing node from the plurality of routing nodes based on available processing capacity of the at least one routing node to provide the application level support.

26. The system of claim 23 wherein the at least one routing node is at least one of a plurality of routing nodes that can provide the application level support for the select traffic and the means for selecting is capable of determining the at least one routing node from the plurality of routing nodes based on available processing capacity of the plurality of routing nodes and the at least one routing node to provide the application level support.

27. The system of claim 23 wherein the means for selecting is capable of selecting a plurality of routing nodes through which to route the select traffic to distribute the application level support for the select traffic and the means for routing is capable of routing the select traffic to facilitate distribution of the application level support such that processing for the application level support is distributed among the plurality of routing nodes while routing the select traffic.

28. The system of claim 27 wherein the means for selecting is capable of selecting the plurality of routing nodes within one routing path such that all of the select traffic is routed through each of the plurality of routing nodes and processing for the application level support is distributed among the plurality of routing nodes while routing the select traffic.

29. The system of claim 27 wherein the means for selecting is capable of selecting the plurality of routing nodes within different routing paths such that a different portion of the select traffic is routed through each of the plurality of routing nodes and processing for the application level support is distributed among the plurality of routing nodes while routing the select traffic.

30. The system of claim 29 wherein the means for selecting is capable of selecting the plurality of routing nodes wherein at least two of the plurality of routing nodes are within one of the different routing paths such that processing for the application level support for the portion of the select traffic routed through the at least two of the plurality of routing nodes is distributed between the at least two of the plurality of routing nodes.

31. The system of claim 23 wherein the means for selecting is capable of:
    identifying possible routing paths between a source and a destination for the select traffic, each of the possible routing paths including the at least one routing node capable of providing the processing resources required to provide the application level support for the select traffic;
    identifying a capacity of the at least one routing node in the possible routing paths to provide the processing resources; and
    determining at least one of the possible routing paths through which to route the select traffic based on the capacity of the at least one routing node in the possible routing paths to provide the processing resources.

32. The system of claim 31 further comprising means for allocating resources of the at least one routing node along the at least one of the possible routing paths to provide the processing for the application level support while routing.

33. The system of claim 23 wherein the means for selecting is capable of:
    identifying possible routing paths between a source and a destination for the select traffic, each of the possible routing paths including the at least one routing node capable of providing the processing resources required to provide the application level support for the select traffic;
    identifying capacities of a plurality of routing nodes among the possible routing paths to provide the processing resources; and
    determining at least one of the possible routing paths through which to route the select traffic based on the capacity of the plurality of routing nodes in the possible routing paths to provide the processing resources.

34. The system of claim 33 wherein the means for selecting is capable of distributing processing among the plurality of routing nodes to provide the application level support for the select traffic.

35. A non-transitory computer readable medium containing software for distributing processing among routing nodes capable of providing application level support during routing, the software comprising computer instructions to:
    identify processing resources required to provide the application level support during routing for select traffic;
    select at least one routing node capable of providing the processing resources required to provide the application level support for the select traffic wherein the at least one routing node is configured to include a control plane, a compute plane and a forward plane; and
    facilitate routing of the select traffic through the at least one routing node capable of providing the processing resources required to provide the application level support,
    wherein the at least one routing node provides the application level support for the select traffic while routing the select traffic in the compute plane.

36. The computer readable medium of claim 35 wherein the at least one routing node is at least one of a plurality of routing nodes that can provide the application level support for the select traffic and the instructions to select the at least one routing node are configured to determine the at least one routing node from the plurality of routing nodes to provide the application level support in a manner to balance processing load among the plurality of routing nodes.

37. The computer readable medium of claim 35 wherein the at least one muting node is at least one of a plurality of routing nodes that can provide the application level support for the select traffic and the instructions to select the at least one routing node are configured to determine the at least one routing node from the plurality of routing nodes based on available processing capacity of the at least one routing node to provide the application level support.

38. The computer readable medium of claim 35 wherein the at least one routing node is at least one of a plurality of routing nodes that can provide the application level support for the select traffic and the instructions to select the at least one routing node are configured to determine the at least one routing node from the plurality of routing nodes based on available processing capacity of the plurality of routing nodes and the at least one routing node to provide the application level support.

39. The computer readable medium of claim 35 wherein the instructions to select at least one routing node are configured to select a plurality of routing nodes through which to route the select traffic to distribute the application level support for the select traffic and the instructions to route are configured to route the select traffic to facilitate distribution of the application level support such that processing for the application level support is distributed, among the plurality of routing nodes while routing the select traffic.

40. The computer readable medium of claim 39 wherein the instructions to select the at least one routing node are configured to select the plurality of routing nodes within one routing path such that all of the select traffic is routed through each of the plurality of routing nodes and the processing for the application level support is distributed among the plurality of routing nodes while routing the select traffic.

41. The computer readable medium of claim 39 wherein the instructions to select the at least one routing node are configured to select the plurality of routing nodes within different routing paths such that a different portion of the select traffic is routed through each of the plurality of routing nodes and the processing for the application level support is distributed among the plurality of routing nodes while routing the select traffic.

42. The computer readable medium of claim 41 wherein the instructions to select the at least one routing node are configured to select the plurality of routing nodes wherein at least two of the plurality of routing nodes are within one of the different routing paths such that the processing for the application level support for the portion of the select traffic routed through the at least two of the plurality of routing nodes is distributed between the at least two of the plurality of routing nodes.

43. The computer readable medium of claim 35 wherein the instructions to select the at least one routing node are configured to:
    identify possible routing paths between a source and a destination for the select traffic, each of the possible routing paths including the at least one muting node capable of providing the processing resources required to provide the application level support for the select traffic;
    identify a capacity of the at least one routing node in the possible routing paths to provide the processing resources; and
    determine at least one of the possible routing paths through which to route the select traffic based on the capacity of the at least one routing node in the possible routing paths to provide the processing resources.

44. The computer readable medium of claim 43 wherein the software further comprises instructions to allocate resources of the at least one routing node along the at least one of the possible routing paths to provide the processing for the application level support while routing.

45. The computer readable medium of claim 35 wherein the instructions to select the at least one routing node are configured to:
   identify possible routing paths between a source and a destination for the select traffic, each of the possible routing paths including the at least one routing node capable of providing the processing resources required to provide the application level support for the select traffic;
   identify capacities of a plurality of routing nodes among the possible routing paths to provide the processing resources; and
   determine at least one of the possible routing paths through which to route the select traffic based on the capacity of the plurality of routing nodes in the possible routing paths to provide the processing resources.

46. The computer readable medium of claim 45 wherein the instructions to select the at least one routing node are configured to distribute processing among the plurality of the routing nodes to provide the application level support for the select traffic.

47. A non-transitory computer readable medium containing software for distributing processing among multiple routing devices capable of providing application level support, the software comprising computer instructions to:
   determine processing resources necessary for application level support of traffic to be routed;
   monitor processing capacity available on a plurality of routing nodes capable of providing the application level support and routing the traffic;
   identify at least two of the plurality of routing nodes having combined processing capacity to provide the application level support necessary for the traffic to be routed wherein the at least two of the plurality of routing nodes are configured to include a control plane, a compute plane and a forward plane; and
   route the traffic in a manner allowing the at least two of the plurality of routing nodes to provide the processing for the application level support in the respective compute planes.

48. The computer readable medium of claim 47 wherein the software further comprises instructions to determine how to distribute the processing for the application level support among the at least two of the plurality of routing nodes based on the processing resources necessary for the application level support.

49. The computer readable medium of claim 48 wherein the software further comprises instructions to reserve sufficient resources of the at least two of the plurality of routing nodes prior to routing to the at least two of the plurality of routing nodes to provide the processing capacity for the application level support necessary for the traffic.

50. A routing element facilitating distribution of application level processing during routing comprising a control system adapted to:
   identify processing resources required to provide the application level support during routing for select traffic;
   select at least one routing node capable of providing the processing resources required to provide the application level support for the select traffic wherein the at least one routing node is configured to include a control plane, a compute plane and a forward plane; and
   route the select traffic through the at least one muting node capable of providing the processing resources required to provide the application level support in the compute plane,
   wherein the routing element provides the application level support for the select traffic while routing the select traffic.

* * * * *

UNITED STATES PATENT AND TRADEMARK OFFICE
CERTIFICATE OF CORRECTION

| | | |
|---|---|---|
| PATENT NO. | : 7,860,999 B1 | Page 1 of 1 |
| APPLICATION NO. | : 09/736678 | |
| DATED | : December 28, 2010 | |
| INVENTOR(S) | : Subramanian | |

It is certified that error appears in the above-identified patent and that said Letters Patent is hereby corrected as shown below:

Claim 9, at column 12, line 37, change "muting" to --routing--.

Claim 20, at column 13, line 52, change "lane" to --plane--.

Claim 23, at column 14, line 5, remove "wed".

Claim 37, at column 16, line 5, change "muting" to --routing--.

Claim 43, at column 16, line 59, change "muting" to --routing--.

Claim 50, at column 18, line 31, change "muting" to --routing--.

Signed and Sealed this
Twenty-second Day of March, 2011

David J. Kappos
*Director of the United States Patent and Trademark Office*